United States Patent [19]

Viles

[11] Patent Number: 4,875,937

[45] Date of Patent: Oct. 24, 1989

[54] CEMENTITIOUS COMPOSITION

[75] Inventor: Robert F. Viles, Curdworth, Great Britain

[73] Assignee: Fosroc International Limited, Birmingham, England

[21] Appl. No.: 260,976

[22] Filed: Oct. 21, 1988

[30] Foreign Application Priority Data

Oct. 29, 1987 [GB] United Kingdom ............... 87 25385

[51] Int. Cl.$^4$ .......................... C04B 7/32; C04B 11/06
[52] U.S. Cl. ..................................... 106/104; 106/109
[58] Field of Search ............................... 106/104, 109

[56] References Cited

U.S. PATENT DOCUMENTS

| | | | |
|---|---|---|---|
| 4,350,533 | 9/1982 | Galer et al. ......................... | 106/104 |
| 4,481,037 | 11/1984 | Beale et al. ......................... | 106/104 |

FOREIGN PATENT DOCUMENTS

| | | |
|---|---|---|
| 1166072 | 3/1964 | Fed. Rep. of Germany . |
| 2857396 | 6/1985 | Fed. Rep. of Germany . |
| 2529192 | 12/1983 | France . |
| 58-099147 | 6/1983 | Japan ................................... 106/104 |
| 60-127252 | 7/1985 | Japan . |
| 0239504 | 10/1926 | United Kingdom . |
| 1099109 | 1/1968 | United Kingdom . |
| 2166430 | 5/1986 | United Kingdom ................ 106/104 |
| 2168695 | 6/1986 | United Kingdom ................ 106/104 |

OTHER PUBLICATIONS

"Concrete Articles with High Strength and Weathering Resistance", Chemical Abstract No. 104: 55336K.

*Primary Examiner*—William R. Dixon, Jr.
*Assistant Examiner*—Anthony J. Green
*Attorney, Agent, or Firm*—Caesar, Rivise, Bernstein, Cohen & Pokotilow, Ltd.

[57] ABSTRACT

A cement composition to be combined with water comprises high alumina cement, beta anhydrite, aluminium sulphate, a source of free lime and a reactive filler, eg. blast furnace slag to form a rapid setting and hardening durable material.

14 Claims, No Drawings

CEMENTITIOUS COMPOSITION

The invention relates to a cementitious composition based on so called high alumina cement, and in particular to a composition containing this cement and formulated so that on hydration it will set and develop strength quickly. More particularly, the invention relates to an easily placed cementitious composition which will set rapidly to develop high strength, in particular to a material requiring low solids content per cu. metre placed, which could be used for example, for filling the annulus between an underground roadway tunnel and its supporting structure. High yield grouts are of great benefit to underground operations since the transport of materials underground in operations such as coalmining, is costly and time consuming. Traditional grouts based upon Ordinary Portland cement (OPC) or blends of Ordinary Portland cement and pulverised fly ash have been used at low water:solids ratio. These set slowly and have other drawbacks. There is a need for a more rapid setting and rapid hardening dry composition which develops a thixotropic consistency within a short time of being mixed with water. Improvements can be effected in compositions based on Ordinary Portland cement by the use of additives, but the level of material consumption (generally in excess of 1 tonne per cu. meter) and environmental acceptance (Ordinary Portland cement is aggressive and highly irritant to the skin) remain. It is one object of this invention to satisfy that need.

It has now been discovered that, if the high alumina cement is hydrated in the presence of some additives, especially in defined proportions, a rapid setting and hardening composition is formed and the set material has improved durability.

In one aspect, the invention provides a composition for admixture with water to form a rapid setting and rapid hardening material, the composition comprising high alumina cement, beta anhydrite, at least 1% by weight of aluminium sulphate, a source of free lime in sufficient quantity to cause the formation of ettringite on hydration, and a reactive filler.

The high alumina cement is any cement which falls within the definition of a high alumina cement according to B.S. 915 Part 2, i.e. a cement which contains not less than 32% by weight of alumina and has an alumina to calcium oxide ratio of between 0.85 and 1.3:1. Analyses of suitable cements are by weight, 39./0% alumina, 3/S.5% calcium oxide, 16.5% iron oxide ($Fe_2O_3$) and 4.0% silica; and 37.7% alumina, 42% calcium oxide, 2.25% silica, balance iron oxide. The high aluminia cement can make up as little as 10% by weight and as much as 50% by weight of the composiion.

Ettringite is formed on hydration. Ettringite is a calcium trisulpho-aluminate having 32 molecules of water of crystallisation and has the formula $3CaO.Al_2O_3.3CaSO_4.32H_2O$. It is necessary to have regard to the content of the free lime relative to the high alumina cement in order to form ettringite. Irrespective of the source of lime, it should be in the range of about 3 to about 9% by weight relative to the high alumina cement. The optimum percentage will be determined by the specific raw materials employed and the level of aluminium sulphate. Inadequate lime supply will result in low strength development, whereas excessive lime will prevent the reaction from proceeding as required. The potential free lime may be calculated by:

$$PFL = \frac{100 ([\% \ CaO] + A[\% \ CaSO_4] + B[\% \ X] - C[\% \ Al_2(SO_4)_3.14H_2O])}{[\% \ HAC]}$$

where percentage refer to the percent quantity added to the formulation:

A is the proportion of lime present in the beta anhydrite employed. (In all the examples given below this was 0.00/89)

B is a constant for any potential reactive constituent X which may release lime. An approximation for OPC is 0.25.

C is a constant of value 0.5656. This represents the stoichiometric equivalence of aluminium sulphate tetradecahydrate as lime in order to form ettringite.

It is a further requirement that the aluminium sulphate content is greater than about 1% relative to the HAC, preferably from about 1% to about 12.5%. The aluminium sulphate ($Al_2(SO_4)_3 \ 14H_2O$) is required to ensure that not only will the composition set rapidly but the strength will develop rapidly. In addition, the aluminium sulphate can control the content of excess lime.

It is essential that the calcium sulphate be in the form of beta-anhydrite because other forms of calcium sulphate when used alone do not give satisfactory results. Hydrated forms such as plaster of Paris or gypsum both give strengths which are too low during the initial stages of setting and gamma anhydrite hydrates very rapidly in water and gives similar results to the hydrated forms.

Blast furnace slag is a preferred reactive filler and is preferably used in ground granulated form. This component may be replaced in part by other reactive fillers e.g. pulverised fly ash, but some of this slag is essential to the invention if the desired rate of set and hardening are to be achieved.

Preferably the reactive filler makes up about 10% by weight of the composition if the set material is to be durable, i.e resistant to the effects of atmosphere such as carbonation.

Additives may be present. For example, lithium carbonate may be present as an accelerator for the high alumina cement; thickeners or sugars may be present; Ordinary Portland cement may be the source of the calcium oxide; foaming agents; and the like.

In another aspect this invention provides a method of placing a fast settable and hardenable material at a site of use comprising supplying to the site a dilute aqueous slurry of a composition of the invention and allowing or casing the placed slurry to set and harden rapidly.

The dry composition may be mixed with water to form a very dilute slurry for placing. The ratio of water:dry solids may be from 1.2:1 by weight to about 2.5:1.

The setting time and strengths may be varied according to the intended use. If the composition is to be useful in making an easily placed slurry to provide a high strength grout, then the following parameters are preferred:

period for the placed slurry to become thixotropic: between about 1 and 5 minutes period for the placed thixotropic slurry to become nonpourable: between about 3 and 10 minutes water:cement ratio from at least 1.2:1 to 2.:1 initial strength after 2 hours: at least 0.3 Newton $mm^{-2}$ 1 day strength: at least 1.5 Newtons mm$^{-2}$
7 days strength: at least 3 Newtons mm$^{-2}$ These parameters may be varied e.g. for monolithic packing the 7 day strength will be at least 4 Newtons mm$^{-2}$.

The invention is illustrated by the following examples in which parts are by weight unless otherwise specified.

EXAMPLE 1

A composition was made up as follows:

| | |
|---|---|
| ground granulated blast furnace slag | 46.05 |
| beta anhydrite | 25.00 |
| high alumina cement | 25.00 |
| calcium oxide | 2.30 |
| lithium carbonate | 0.15 |
| aluminium sulphate | 1.50 |

The free lime was calculated to be about 6.7% relative to that of the high alumina cement. The composition was mixed with water in a weight ratio of 1.818 : 1 water:solids to provide a very dilute easily placeable slurry. The composition became thixotropic within about 4 minutes and set to a non-pourable condition in about 8 minutes. After two hours the strength was 0.60 Newtons mm$^{-2}$. After one day it was 2.2 Newtons and after 7 days 3.9 Newtons mm$^{-2}$. The resultant hardened composition was resistant to surface erosion whilst drying to a light cream/buff colour which in a mining environment is desirable because of the light reflective properties.

It will be noted that, despite the high water content, the wetted composition sets rapidly and develops a high strength.

EXAMPLES 2 to 20

Compositions were made up as shown in Table 1, mixed with water and tested; the details are also shown in Table 1. The results of Examples 2, 3 and 4 show the effect of reducing the content of aluminium sulphate relative to that of Example 1. A reduction of that content (Example 5) shows that there is a reduction in the setting characteristics; a further reduction (Example 6) shows even further deterioration. Example 4 is better than Example 3 despite having the same content of aluminium sulphate because of the increased free lime content.

The results of Examples 5 and 6 show that initial set may be retarded slightly if a content of sugar is present, while the strength development is not affected significantly. Examples 7, 8, 9 and 10 demonstrate the effect of increasing content of beta anhydrite. If this is accompanied by an increase in the content of high alumina cement (Example S) then a very good strength develops. Examples 11, 12, 13 and 14 show that in the absence of the ground granulated blast furnace slag while fast setting occurs, the strength development is not obtained.

Examples 15 and 16 demonstrate that Ordinary Portland cement can be used as a source of the free lime and provided that the concentrations are below the level at which this material is irritant, this can be beneficial. Examples 17 and 18 are similar to Examples 11 to 14, Example 19 shows that when the content of the high alumina cement is low, a slight increase in the content of the slag will not provide the required strength. Example 20 shows that calcium sulphate hemihydrate is not a substitute for the beta anhydrite.

TABLE 1

| | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| ground granulated blast furnace slag | 46.55 | 46.75 | 46.21 | 46.09 | 40.50 | 36.01 | 36.72 | 36.01 | 23.42 | 47.02 | 0 | 0 | 0 | 43.05 | 41.45 | 0 | 0 | 44.33 | 35.75 |
| beta anhydrite | 25.00 | 25.00 | 25.00 | 25.00 | 30.00 | 36.01 | 30.00 | 36.01 | 48.60 | 25.00 | 25.00 | 72.02 | 25.00 | 25.00 | 25.00 | 11.4 | 66.05 | 37.50 | — |
| high alumina cement | 25.00 | 25.00 | 25.00 | 25.00 | 25.00 | 25.00 | 30.00 | 25.00 | 25.00 | 25.00 | 25.00 | 25.00 | 25.00 | 25.00 | 25.00 | 25.0 | 30.00 | 15.00 | 30.00 |
| calcium oxide | 2.10 | 2.10 | 2.40 | 2.40 | 2.57 | 1.90 | 2.20 | 1.90 | 1.90 | 1.90 | 1.90 | 1.90 | 1.90 | 1.30 | 0.90 | 1.91 | 2.30 | 1.52 | 2.60 |
| lithium carbonate | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| aluminium sulphate | 1.20 | 1.00 | 1.20 | 1.20 | 0.65 | 0.80 | 0.80 | 0.80 | 0.80 | 0.80 | 0.80 | 0.80 | 0.80 | 1.50 | 1.50 | 1.50 | 1.50 | 1.50 | 1.50 |
| OPC | — | — | — | 0.16 | 0.13 | — | — | — | — | — | — | — | — | 4.00 | 6.00 | — | — | — | — |
| Sugar | — | — | — | — | — | 0.13 | 0.13 | 0.13 | 0.13 | 0.13 | 0.13 | 0.13 | 0.13 | — | — | — | — | — | — |
| limestone | — | — | — | — | — | — | — | — | — | — | 47.02 | — | 47.02 | — | — | — | — | — | — |
| pulverised fly ash | — | — | — | — | — | — | — | — | — | — | — | — | — | — | — | — | — | — | 30.00[xx] |
| % free lime | 6.57 | 7.02 | 7.77 | 7.77 | 7.61 | 7.07 | 6.71 | 7.07 | 7.52 | 6.68 | 6.68 | 8.35 | 6.68 | 6.69 | 7.09 | 6.79 | 6.80 | 6.70 | 5.84 |
| watersolids | 1.64 | 1.64 | 1.64 | 1.64 | 1.64 | 1.45 | 1.64 | 1.45 | 1.45 | 1.30 | 1.30 | 1.30 | 1.30 | 1.64 | 1.64 | 1.64 | 1.64 | 1.64 | 1.50 |
| thixotropy period (mins) | 6 | 12 | 2.5 | 4.5 | 1.5 | 3.0 | 7.0 | 4.0 | 2.0 | 4.5 | 4.5 | 4.5 | 3.0 | 5.0 | 6.5 | 4 | 3.5 | 5 | 8 |
| non pourable (mins) | 9 | 20 | 6.0 | 8.5 | 5.0 | 8.5 | 10.5 | 6.5 | 4.0 | 9.0 | 8.0 | 8.0 | 4.5 | 7.0 | 8.0 | 7 | 7 | 8 | 12 |
| 2 hour strength | 1.54 | 0.26 | 0.64 | 0.54 | 0.43 | 0.44 | 2.07 | 0.59 | 0.41 | x | x | x | x | 0.77 | 0.7 | 0.48 | 0.92 | 0 | 0 |
| 1 day strength | 2.21 | 1.10 | 2.30 | 2.16 | 1.82 | 2.27 | >5.0 | 2.38 | 1.95 | 4.31 | 2.46 | 1.11 | 1.52 | 2.75 | 2.72 | 0.64 | 1.16 | 0.25 | 0.10 |
| 7 day strength | 4.80 | 3.72 | 4.54 | 4.38 | 5.0 | >5.0 | — | 4.07 | 3.82 | >5.0 | 2.47 | 1.38 | 1.40 | >5.0 | >5.0 | 0.65 | 1.24 | x | x |

[x] not measured
[xx] calcium sulphate hemihydrate

I claim:

1. A dry cementitious composition for admixture with water to form a rapid setting and hardening material, the composition comprising:

high alumina cement making up from about 10% to about 50% of the composition, calcium sulphate in the form of beta anhydrite present in an amount of at least 11.4%, aluminum sulphate in a proportion of from about 1% to about 13% by weight relative to the high alumina cement, a source of free lime in a proportion of from about 3% to about 9% by weight relative to the high alumina cement, a reactive filler making up at least 10% by weight of the composition, whereby ettringite is formed on hydration and the hydrated material is durable.

2. A composition according to claim 1, in which the aluminium sulphate is present in a concentration of about 1% to 12.5%, relative to the high alumina cement.

3. A composition according to claim 1, wherein the reactive filler is a blast furnace slag.

4. A composition according to claim 3, wherein pulverised fly ash is additionally present as a reactive filler.

5. A composition according to claim 1, wherein Ordinary Portland cement is present to provide free lime.

6. A composition according to claim 1, wherein additives selected from the group of accelerators, thickeners and foaming agents are present.

7. A method of placing a fast settable material at a site of use, comprising supplying to the site of use a dilute aqueous slurry of water and a cementitious composition comprising:

high alumina cement making up from about 10% to about 50% of the composition, calcium sulphate in the form of beta anhydrite present in an amount of at least 11.4%, aluminum sulphate in a proportion of from about 1% to about 13% by weight relative to the high alumina cement, a reactive filler making up at least 10% by weight of the composition and allowing or causing the placed slurry to set to form ettringite and harden rapidly to form a durable set material.

8. A method according to claim 7 wherein the slurry is formed of water and the dry composition in a weight ratio of 1.2 to 2.5 parts:1 water:solids.

9. A method according to claim 7, wherein the content of the aluminium sulphate is from 1% to 12.5% relative to the high alumina cement.

10. A method according to claim 7, wherein the reactive filler is blast furnace slag.

11. A method according to claim 7, wherein pulverised fly ash, is present as the reactive filler.

12. A method according to claim 7, wherein the slurry includes additives selected from the group of accelerators, thickeners and foaming agents.

13. A durable set cement being the set and hardened product containing ettringite formed from a slurry and water and a dry cementitious composition, the water and the dry composition being admixed in a weight ratio of 1.2 to 2.5 parts water:1 solids, the composition comprising:

high alumina cement making up from about 10% to about 50% of the composition, calcium sulphate in the form of beta anhydrite present in an amount of at least 11.4% aluminum sulphate in a proportion of from about 1% to about 13% by weight relative to the high alumina cement, a source of free lime in a proportion of from about 3% to about 9% by weight relative to high alumina cement, a reactive filler making up at least 10% by weight of the composition.

14. A product according to claim 13, including additives selected from the group of accelerators, thickeners and foaming agents.

* * * * *